United States Patent [19]

Steele

[11] Patent Number: 5,884,056
[45] Date of Patent: Mar. 16, 1999

[54] METHOD AND SYSTEM FOR VIDEO BROWSING ON THE WORLD WIDE WEB

[75] Inventor: David Aaron Steele, Cupertino, Calif.

[73] Assignee: International Business Machines Corporation, Armonk, N.Y.

[21] Appl. No.: 581,300

[22] Filed: Dec. 28, 1995

[51] Int. Cl.$^6$ .................................................. G06F 19/00
[52] U.S. Cl. ........................ 395/339; 395/356; 395/328
[58] Field of Search .................................. 395/155, 156, 395/157, 158, 160, 161, 162, 200, 400, 339, 340, 341, 348, 379, 356, 357, 358, 342, 347

[56] References Cited

U.S. PATENT DOCUMENTS

| 5,530,852 | 6/1996 | Meske, Jr. et al. | 395/600 |
| 5,548,692 | 8/1996 | Cok | 395/348 |
| 5,550,561 | 8/1996 | Ziarno | 345/163 |
| 5,572,643 | 11/1996 | Judson | 395/793 |
| 5,598,557 | 1/1997 | Doner et al. | 395/348 |

FOREIGN PATENT DOCUMENTS

| 0 619 550 A2 | 10/1994 | European Pat. Off. | G06F 15/40 |

OTHER PUBLICATIONS

M. Mills et al., "A Magnifier Tool for Video Data", *Proceedings of Chi '92*, Monterey, CA, May 3–7, 1992, pp. 93–98.

S. W. Smoliar et al., "Interacting with Digital Video", *Proceedings of the Region 10 Annual International Conference*, Tenco, Singapore Aug. 22–26, 1994, pp. 852–856.

*Primary Examiner*—Raymond J. Bayerl
*Assistant Examiner*—Steven P. Sax
*Attorney, Agent, or Firm*—Romualdas Strimaitis; James C. Pintner

[57] ABSTRACT

A system and method are provided for supporting video browsing over a communication network such as the Internet/World Wide Web. A graphical user interface is provided through a client software tool such as a Web browser. A client/user selects a video data object stored at a remote server. A set of points within the object are displayed at the client's graphical user interface display, as representations, preferably thumbnail images, of the points within the object. The user selects an interval defined by the representations, preferably the interval between two temporally adjacent representations. Responsive to this selection, a new set of points, falling within the selected interval, are chosen, and representations of those points are generated and displayed. By doing so repeatedly, the user can easily browse through the video data object, and quickly and easily zero in on a desired portion of the video data object.

20 Claims, 8 Drawing Sheets

Select a Video

Energy 1 Video — 48

46

Energy 1 mpeg file — 50

Three Stooges — 48

METHOD AND SYSTEM FOR VIDEO BROWSING ON THE WORLD WIDE WEB

FIELD OF THE INVENTION

The invention generally relates to the fields of computer systems and multimedia communications, and more particularly relates to the fields of video storage and compression, and of interactive video playback and browsing.

GLOSSARY OF TERMS USED

While dictionary meanings are also implied by certain terms used here, the following glossary of some terms may be useful.

Internet ("the Net"): The connection system that links computers worldwide in a network.

TCP/IP: Transmission Control Protocol/Internet Protocol. A packet switching scheme the Internet uses to chop, route, and reconstruct the data it handles, from e-mail to video.

World Wide Web (WWW. "the Web"): The Internet's application that lets people seeking information on the Internet switch from server to server and database to database by clicking on highlighted words or phrases of interest. An Internet Web server supports clients and provides information.

Home page: A multi-media table of contents that guides a Web user to stored information on the Internet.

Server: A machine (computer) which performs a task at the command of another machine ("client"). In the context of the present invention, a server's primary function is to facilitate distribution of stored information over the Web.

Client: A machine which provides commands to a server, and is serviced by the server. Typically, a client machine is operated by an end user, and functions responsive to user commands.

Web Browser: A program running on a user-operated client computer. When a user "surfs" the Web using a browser, the browser acts as an Internet tour guide, allowing the client machine to display pictorial desktops, directories and search tools supported by the server.

URL: Universal Resource Locater, a Web document version of an e-mail address, in character string form, which uniquely identifies a document, application, or tool available over the Web.

Hyperlink: A network addressing tool embedded in a user-understandable displayed and/or highlighted item, such as a word, phrase, icon or picture. A URL can be accessed by means of its corresponding Hyperlink. When a user on a client machine selects the highlighted hyperlink through the user interface, the underlying item is then retrieved to the client supporting a Web browser.

HTTP Hypertext transfer protocol: Hypertext transfer protocol. The character string "http:" at the beginning of a URL indicates that the document or file designated by the URL contains hyperlinks defined according to the HTTP.

HyperText Markup Language (HTML): HTML is the language used by Web servers to create and connect documents that are viewed by Web clients. HTML uses Hypertext documents. Other uses of Hypertext documents are described in the following U.S. Patents:

Bernstein et al., U.S. Pat. No. 5,204,947, issued Apr. 20, 1993;

Bernstein et al., U.S. Pat. No. 5,297,249, issued Mar. 22, 1994; and

Lewis, U.S. Pat. No. 5,355,472, issued Oct. 11, 1994;

all of which are assigned to International Business Machines Corporation, and which are referenced herein.

BACKGROUND OF THE INVENTION

In recent years, the technologies of video data compression, storage, and interactive accessing have converged with network communications technologies, to present exciting prospects for users who seek access to remotely stored multimedia information.

In the area of network communications technologies, particularly exciting has been the recent prominence of the Internet and its progeny, the World Wide Web. The Internet and the Web have captured the public imagination as the so-called "information superhighway." Accessing information through the Web has become known by the metaphorical term "surfing the Web."

The Internet is not a single network, nor does it have any single owner or controller. Rather, the Internet is an unruly network of networks, a confederation of many different networks, public and private, big and small, whose human operators have agreed to connect to one another. The composite network represented by these networks relies on no single transmission medium. Bi-directional communication can occur via satellite links, fiber-optic trunk lines, phone lines, cable TV wires and local radio links.

To this point the World Wide Web (Web) provided by the Internet has been used in industry predominately as a means of communication, advertisement, and placement of orders. The World Wide Web facilitates user access to information resources by letting people jump from one server to another simply by selecting a highlighted word, picture or icon (a program object representation) about which they want more information—a maneuver known as a "hyperlink". In order to explore the WWW today, the user loads a special navigation program, called a "Web browser" onto his computer.

There are a number of browsers presently in existence and in use. Common examples are NetScape, Mosaic and IBM's Web Explorer. Browsers allow a user of a client to access servers located throughout the world for information which is stored therein. The information is then provided to the client by the server by sending files or data packets to the requesting client from the server's storage resources.

Part of the functionality of a browser is to provide image or video data. Web still image or video information can be provided, through a suitably designed Web page or interface, to a user on a client machine. Still images can also be used as Hypertext-type links, selectable by the user, for invoking other functions. For instance, a user may run a video clip by selecting a still image.

However, video data objects are very large, or, to put it more precisely, the quantity of data per unit time in a real-time viewing of a video data object is large. As a consequence, access by a user to a desired video data object is subject to data throughput constraints. The present state of the art makes it impracticable to provide more than a few tens of seconds of real-time video over the Internet with a response time that will be satisfactory to a user.

Therefore, multimedia and communication systems for providing users with access to video data objects, for browsing, searching, etc., must grapple with the problem of providing video data in a manner which best utilizes the available throughput to provide video data in a form which is most useful to the user.

With this design objective in mind, let us now consider the state of the art in the technologies of video data compression, storage, and interactive accessing. Recent work has been done to make video material more available and usable over the Web. For instance, an article in the August 1995 issue of ADVANCED IMAGING, by Amy T. Incremona, titled "Automatically Transcribing and Condensing Video: New Technology is Born", describes a method for providing video having an accompanying textual index, such as audio narration or closed caption text. Still images are presented, along with a transcription of audio text that accompanies the images (illustration on page 60). This information is provided in HTML format. Thus, a user can take advantage of the temporal correspondence between video shots and narration or closed caption text. To find a desired point in the video corresponding with a known point in the text, the user performs a key word search for the known point in the text. The result of this key word search is that the desired point in the video is reached.

Figure 1:
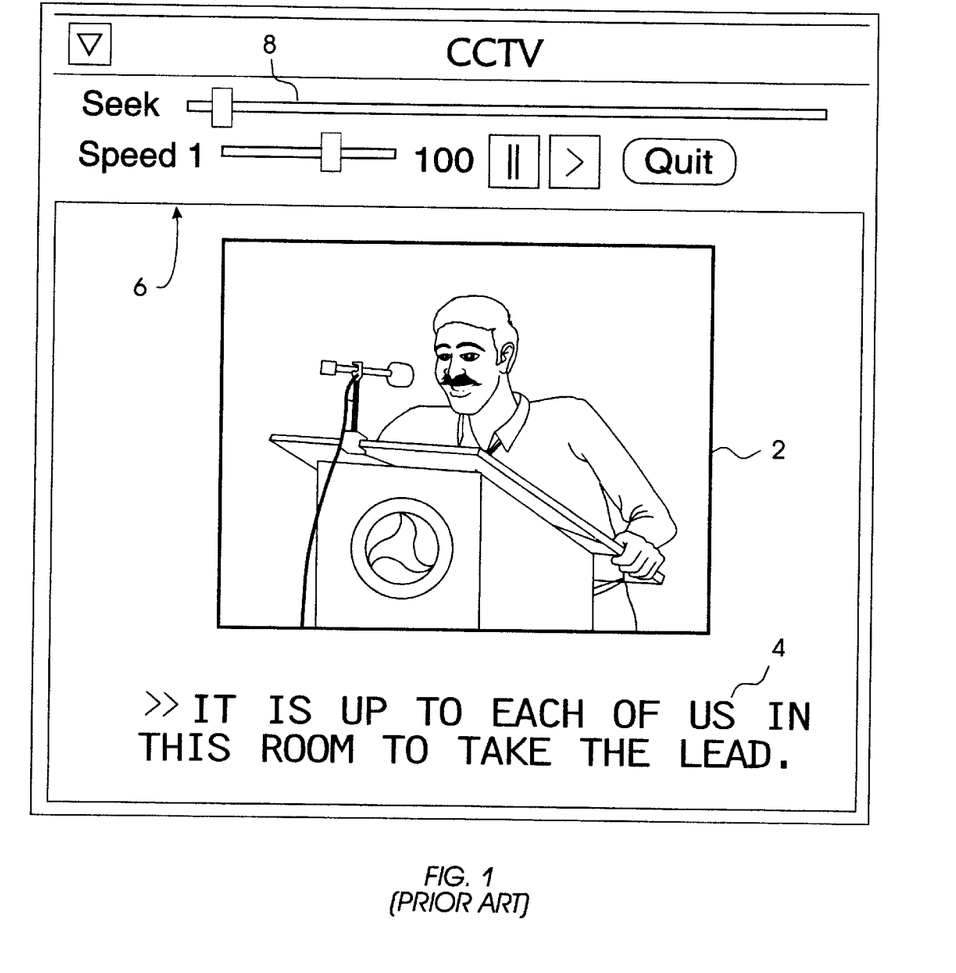
FIG. 1 is an illustration of a prior art graphical user interface for video browsing.

Additionally in Shahraray et al., "Automatic Generation of Pictorial Transcripts of Video Programs", SPIE Vol. 2417, pp. 512–518, there is described an automatic authoring system for the generation of pictorial transcripts of video programs which are accompanied by closed caption information. The system employs a table having a series of rows, each row containing a pointer to a location of an image, and another pointer to the beginning of a text segment related to the image. A viewing window for a GUI display is shown in FIG. 4 of Shahraray et al., and reproduced herein in simplified form as FIG. 1 of the present patent application. FIG. 1 shows a video image 2, a closed caption text subtitle area 4, and a basic user control area 6. The basic user controls include a "Seek" slider 8.

Accordingly, the state of the art allows for user access to video information based on associated text. However, a more general method for accessing video, not provided by the prior art, would sever the tie between video images and accompanying audio narration or closed caption text.

SUMMARY OF THE INVENTION

It is therefore an objective of the present invention to provide a system and method for allowing convenient user access to a stored video object, vor viewing and browsing, through a communication medium having a client-server architecture, such as the World Wide Web.

It is a further objective of the present invention to provide such convenient user access to a stored video object without requiring that access to the video object be keyed with any text or other accompanying indicia, not actually part of the video itself.

To achieve these and other objects, there is provided, in accordance with the invention, a method for displaying, on a user terminal, video data object information pertaining to a stored video data object, the stored video object including a temporal beginning point, a temporal end point, and temporal intermediate points therebetween.

The method comprises the following steps:

First, a sequence of representations of points within the video data object, preferably still images, is provided to the user through a user interface. Each representation or still image that is provided corresponds with one of the temporal points in the video data object. In a typical environment, in which the user is an Internet/World Wide Web user, and the video data object is stored in a remote repository accessible through a server, the step of providing the representations includes performing suitable operations to identify points within the video data object, for which representations are to be provided. A preferred technique is to detect scene cuts.

Then, a user interface is provided, including means for allowing a user to select an interval between first and second ones of the temporal points. The user interface is preferably a graphical user interface (GUI), as is commonly made available through computer operating systems such as IBm's OS/2 and Microsoft's Windows operating systems. Also, suitable user interface equipment, such as a video screen and a mouse, are preferably used.

Finally, responsive to user selection of such an interval, a subsequence of representations is provided, each representation of the subsequence corresponding with a respective temporal point in the video data object, each of the respective temporal points falling between the first and second temporal points selected as discussed above.

Therefore, by providing this capability, the invention allows a user to iteratively home in on the portion of a lengthy, large video object that he/she is interested in. The invention advantageously eliminates the need to use text accompanying the video object as a crutch, as was done in the prior art discussed above.

While the invention is primarily disclosed as a method, it will be understood by a person of ordinary skill in the art that an apparatus, such as a conventional data processor, including a CPU, memory, I/O, program storage, a connecting bus, and other appropriate components, could be programmed or otherwise designed to facilitate the practice of the method of the invention. Such a processor would include appropriate program means for executing the method of the invention. Also, an article of manufacture, such as a pre-recorded disk or other similar computer program product, for use with a data processing system, could include a storage medium and program means recorded thereon for directing the data processing system to facilitate the practice of the method of the invention. It will be understood that such apparatus and articles of manufacture also fall within the spirit and scope of the invention.

DESCRIPTION OF THE PREFERRED EMBODIMENT

Figure 2:
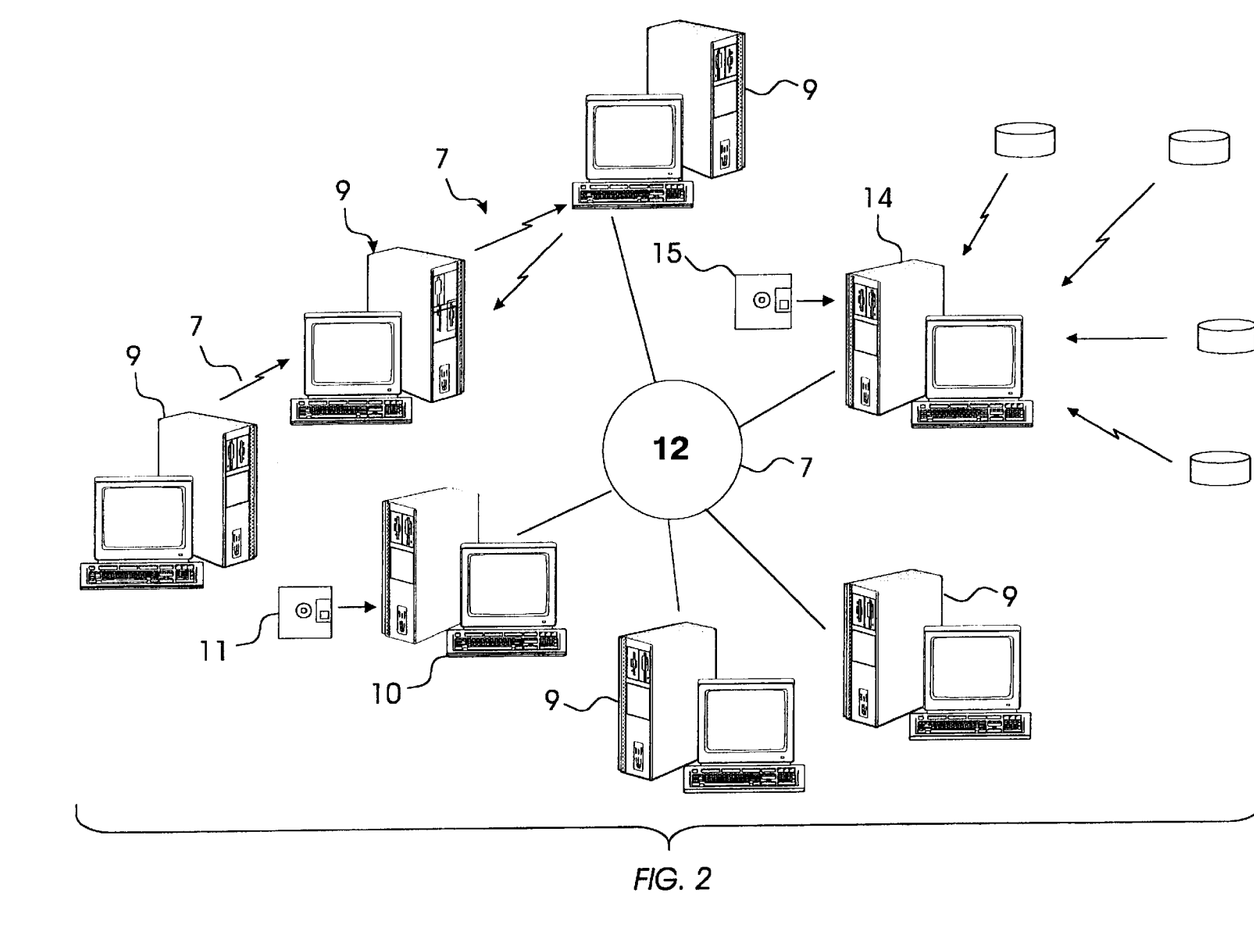
FIG. 2 is a system block diagram of a typical distributed computer system which has internal and external networks, including the Internet, to connect clients to World Wide Web servers and other servers, the client systems being capable of incorporating the invention.

FIG. 2 illustrates a typical communication and processing system, including nodes (computers, processors, etc.) and communication media therebetween, making up an information delivery solution of a typical combination of resources including clients, servers, information repositories, and communication links or networks. Various nodes, shown typically as 9, are also coupled to one another by various networks, shown generally as 7, which may include local area networks (LANs), wide area networks (WANs), etc.

The discussion of FIG. 2 which follows will focus on certain individual components for clearer illustration and description of the novel and non-obvious features of the present invention. In the system of FIG. 2, a client machine 10 includes a computer or other device (as discussed above), running a Web browser program. The program run by the client 10, which incorporates the invention, may be provided to a general purpose computer by means of a commercial computer program product, such as a pre-recorded floppy disk 11 or other suitable computer-readable recording medium. In such a computer program product, the novel and non-obvoius features of the invention, implemented as program code, are pre-programmed onto the disk 11 for convenient sales and marketing, and for directing operation of the client machine 10 in accordance with the invention.

The client 10 is coupled, through a communication network 12 such as the Internet, to a Web server 14. Physical access to the Internet is provided in conventional fashion. The grneral command protocols, etc., for exchanging messages between the client 10 and the server 12, are also conventional.

The client machine 10 may preferably be an intelligent computer system, such as an IBM PS/2 computer, an IBM ThinkPad laptop computer, or an IBM RISC System 6000 workstation. Communication coupling made to the network via a suitable communication interface software tool, such as IBM's OS/2 WARP Connect software product.

The Web browser in the client machine 10 may preferably be the IBM Web Explorer software product, or equivalent software tools such as the NetScape or Mosaic tools. This computer system 10 is bi-directionally coupled with the OS/2 WARP Connect facility over a line or via a wireless system to the server machine 14. The server machine 14 may preferably be another IBM PS/2 computer, an IBM RISC System 6000 workstation, or other similar system.

The program run by the server 14, which incorporates the invention, may be provided to a general purpose computer on a pre-recorded medium, as discussed above, such as a floppy disk 15, in which case the novel and non-obvoius features of the program code are pre-programmed onto the disk 15 for convenient sales and marketing, and for directing operation of the server machine 14 in accordance with the invention.

Figure 3:
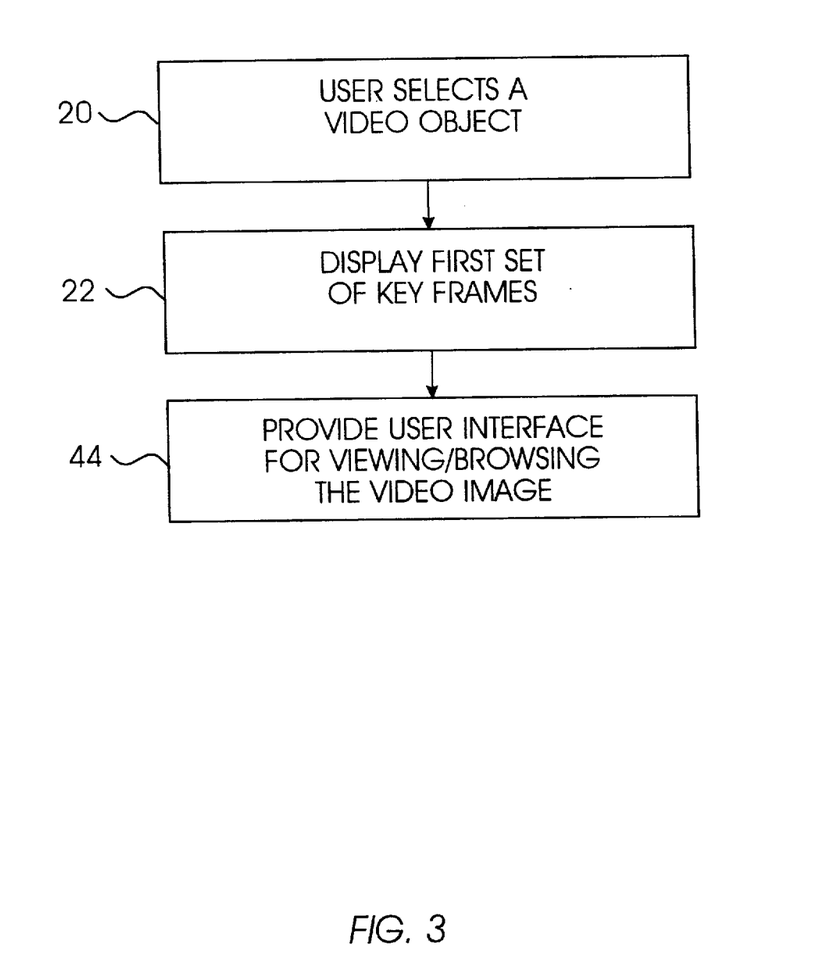
FIG. 3 is a high-level flowchart showing the method of the invention.

FIG. 3 is a high level flowchart showing the operation of the method of the invention. A preferred embodiment of the invention employs a client machine supporting a user interface utilizing HTML format, and further employs the World Wide Web. Much of the functionality of the invention may be carried out at the server. However, the description which follows will be readily understandable from the vantage point of the user at the client machine.

Initially, the user selects a video object (step 20). This may be done in any suitable way. The Web provides numerous formats, techniques, etc., for selecting objects. In the preferred embodiment, selection of the video object by the user causes a request to be sent over the Web from the client machine to the server machine. In particular, a Web page, provided by the server 14 to the client 10, may include a graphical interface, such as Hypertext links, for allowing the user to select an object. A preferred way of facilitating this user selection is by means of a graphical interface such as the Web page shown in FIG. 6 (discussed below). The Web page of FIG. 6 may be designed and implemented using the known techniques such as those given in the references discussed above.

In step 22, a first set of representations of selected points within the video data object are displayed, responsive to the user request. In the preferred embodiment employing the World Wide Web, the selection of the selected points in step 22 takes place at the server. A more detailed description of the server activity implementing step 22, for this preferred embodiment, is given in FIG. 4.

Figure 4:
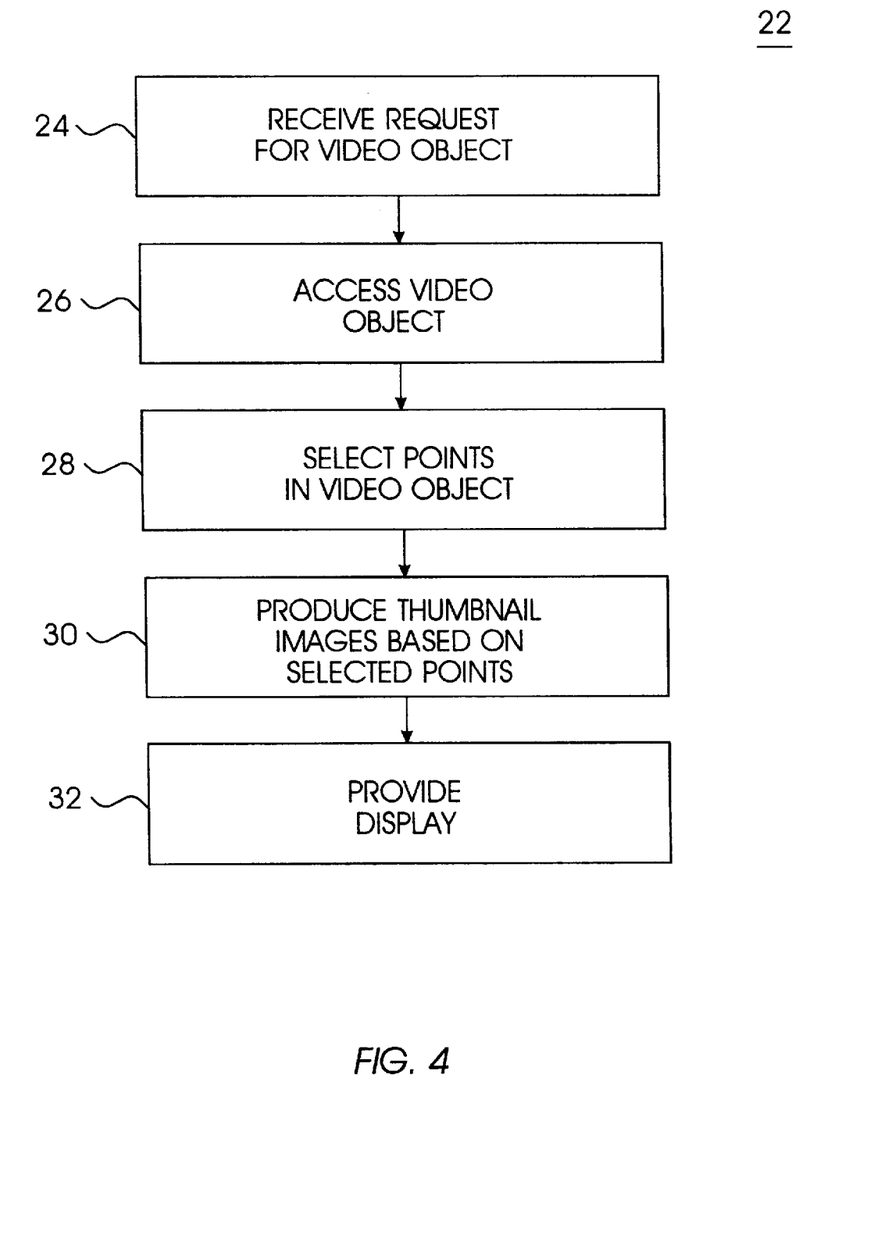
FIG. 4 is a flowchart showing a more detailed implementation of a step of the flowchart of FIG. 3.

Referring to FIG. 4, the server initially receives a user request for a video object (step 24). The server accesses the video object (step 26), and selects a set of temporal points in the object (step 28, described in still more detail in FIG. 5). The server then produces representations of the selected temporal points for display (step 30). In a preferred embodiment, employing the Web and HTML links, the representations of the temporal points are thumbnail images corresponding with the temporal points in the video object. Finally, this information is provided for display (step 32), preferably by transmitting, from the server to the client machine, a display such as a Web page. A preferred implementation is that of the Web page shown in FIG. 6 (discussed below).

Before the display is illustrated and described in detail, a more detailed description will be made of step 28 (selecting temporal points). This may be done in any suitable fashion. A few possible ways would be to select temporal points at random, or evenly spaced, within the video object.

However, it is preferred that the temporal points be selected at scene cut points in the video object. In a preferred embodiment of the invention, step 28 is implemented as shown in more detail in FIG. 5.

Figure 5:
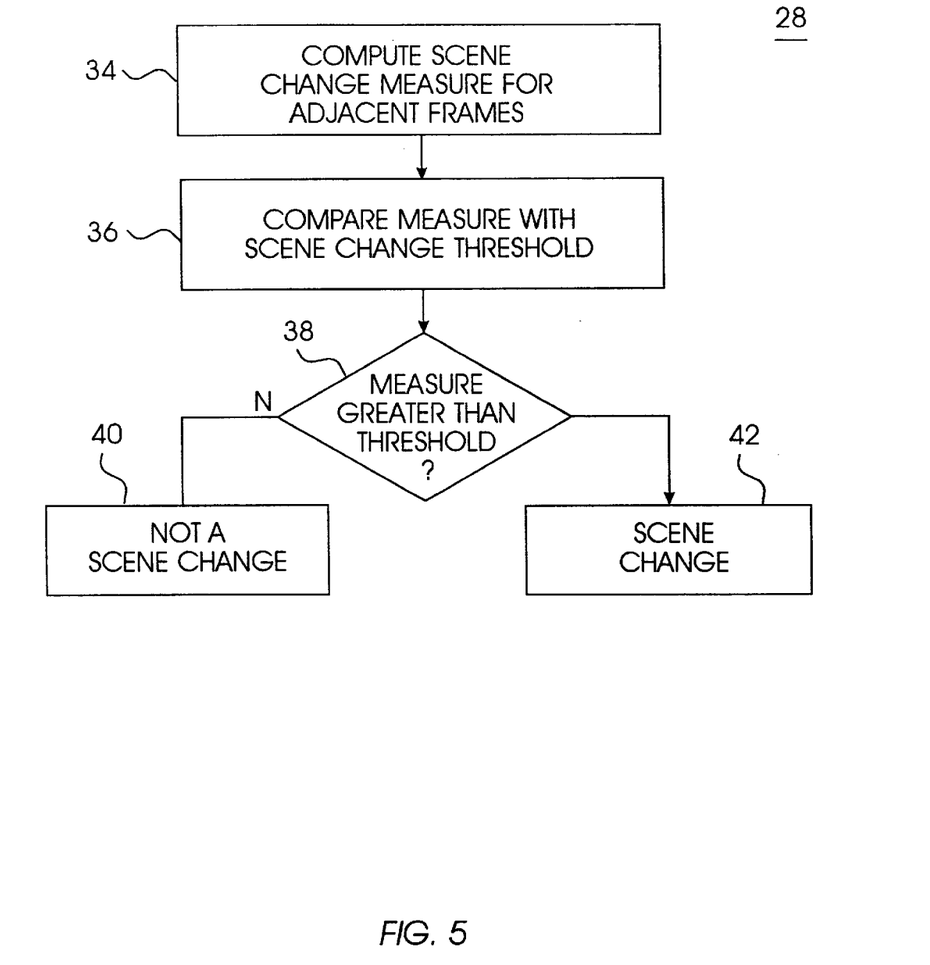
FIG. 5 is a flowchart showing a still more detailed implementation of a step of the flowchart of FIG. 4.

Referring to FIG. 5, a scene change measure is computed for adjacent frames (step 34). In a particular preferred embodiment, the measure is computed by calculating a normalized correlation between the two frames. (For discussion purposes, the frames will be referred to as the "image" I and the "model" M, without necessarily implying any temporal order or sequence between them.)

It is possible to compute the scene change measure using straight correlation, in which case, each pixel of the image I is multiplied with a corresponding pixel of the model M, and a running sum of the products is accumulated. In such a scheme, correspondence might be established by means of row-and-column coordinates or other suitable methods.

However, a particularly preferred approach is as follows: For each pixel of the image I, a neighborhood of the corresponding point in the model M is considered. For calculating the frame change measure, a point within the neighborhood of the model M whose value is closest to the value of the point in the image I, preferably closest in terms of the grey scale value, is multiplied by the value of the point in the image I.

It has been found that using the neighbor point having the nearest value, rather than the exact corresponding point, improves response to motion in areas of high frequency image data. The set of neighbor points in the Model, for a given point in the Image, may be established in any suitable manner, such as by identifying the Image point according to a system such as row-and-column coordinates, and defining the Model neighborhood as the points whose row and column coordinates matched those of the Image point, or were either one above or one below the Image point coordinate values.

Also, a normalized version of correlation is used, in order to reduce sensitivity to changes in illumination between images of essentially the same scene.

A preferred formula, incorporating both the correlation function and the pixel-neighborhood search described above, has been found to work well. Specifically, it is easy to threshold, because it is already normalized. That formula is as follows:

$$r = \frac{n \sum_i I_i M_i - \sum_i I_i \sum_i M_i}{\sqrt{\left(n \sum_i I_i^2 - \sum_i I_i^2\right)\left(n \sum_i M_i^2 - \sum_i M_i^2\right)}}$$

In this expression, r is the scene change measure, and n is the number of active pixels used in the measure calculation. Depending on the particular circumstances or the preference of the user, n can be the total number of pixels in the frame, or a subset of the total number used for the calculation.

$I_i$ is the value (such as the grey scale value) for the i-th one of the pixels in the image I. $M_i$ is the value for one of the pixels in the model M which is to be paired up with $I_i$ for the above-discussed scene change calculation.

The subscript i, for distinguishing between pixels, is a simplified representation for the purpose of the present discussion. Any suitable arrangement for distinguishing between pixels, which would be understood or deemed appropriate to a particular implementation, may be used. For instance, if the pixels are a rectangular array, then the subscript might be an ordered pair, such as row and column counts. A polar coordinate system, or other systems which would be understood to be suitable for a particular implementation, could also be used.

Note that, for this purpose, $M_i$ is either the i-th pixel, or a pixel in the neighborhood of the i-th pixel. That is, if, for instance, a row-and-column coordinate system were used, and a neighborhood were defined as given above, then the Image point $I_i = I_{r,c}$ and the Model point $M_i = M_{(r+1),c}$ might be paired up, if $M_{(r+1),c}$ had the closest value to $I_{r,c}$ of any of the Model points in the defined neighborhood.

Once the scene change values have been determined for the various pairs of adjacent frames in the video object, they are compared with a frame change threshold (step 36 in FIG. 4). As stated above, this expression produces a normalized scene change value, the value being 0 for two identical frames. It is convenient to work with a scene change threshold having a value between 0 and 1. However, any suitable measure of the threshold may be employed.

Then, a test is made (step 38) to determine whether the value is greater than the threshold (alternatively, greater than or equal to the threshold; whichever is considered suitable according to the particular implementation). The result of this test determines whether the two frames are treated as a scene change (steps 40, 42).

Figure 6:
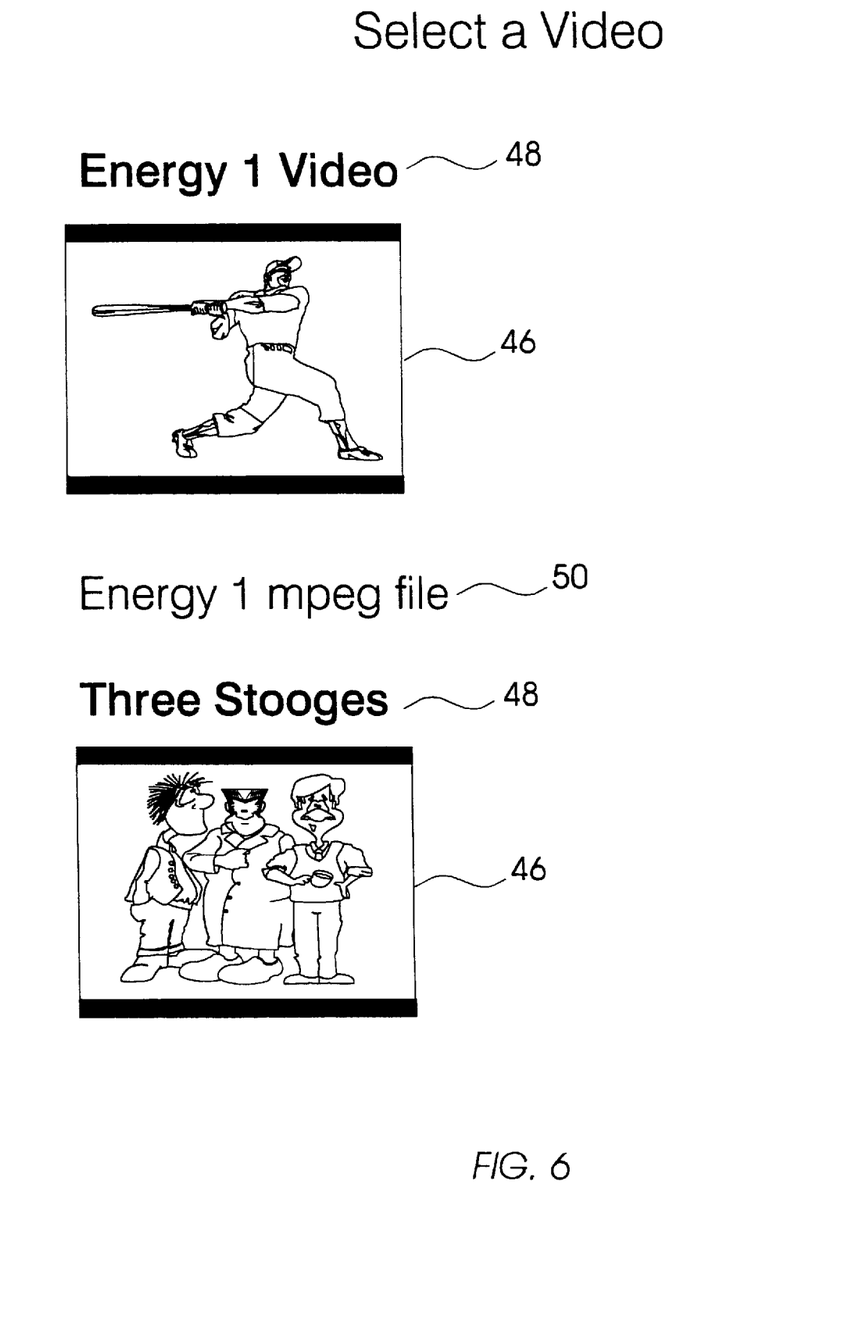
FIG. 6 is an illustration of a graphical user interface according to the invention.
Figure 7:
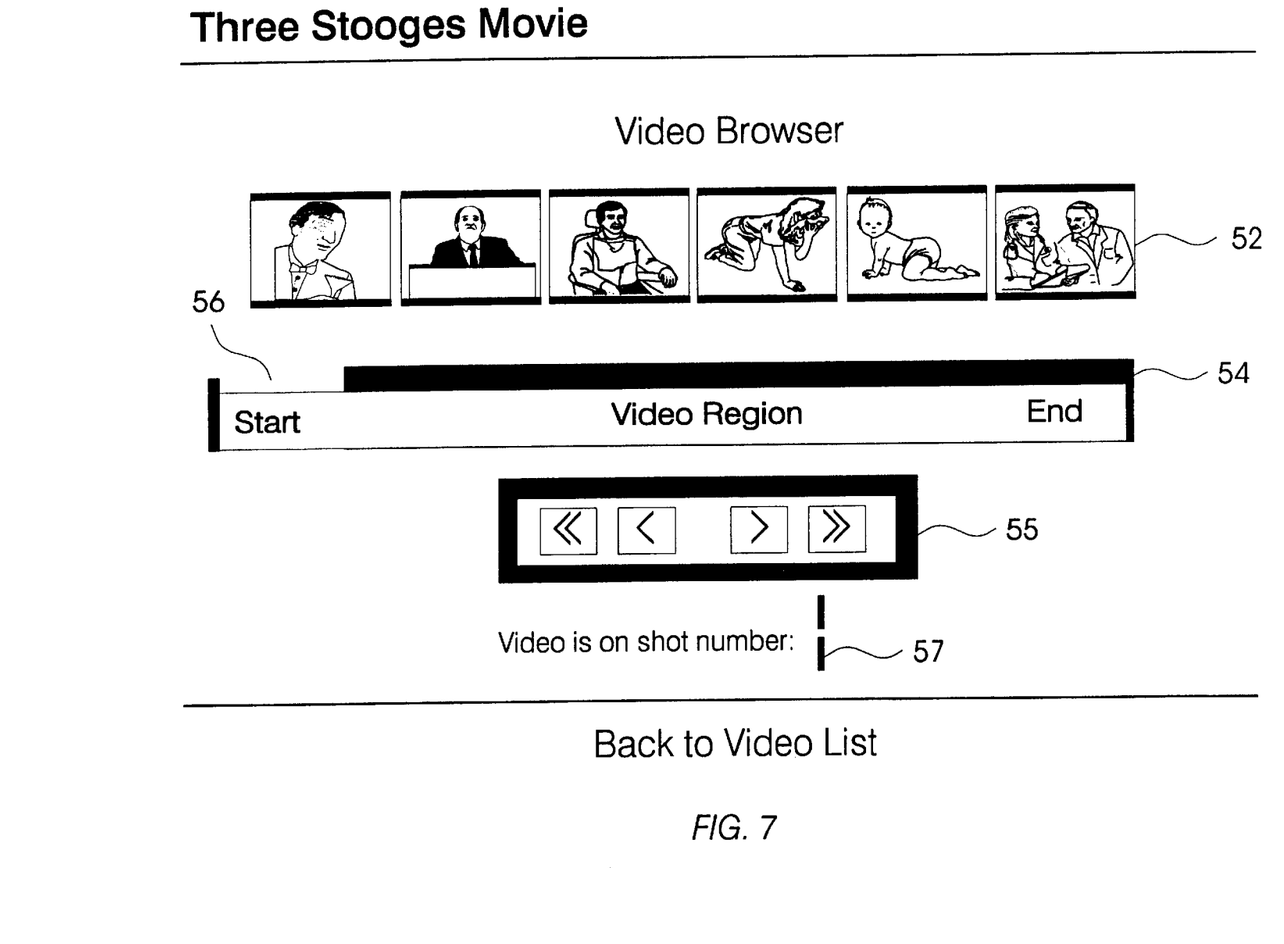
FIG. 7 is an illustration of a graphical user interface according to the invention.

A preferred graphical implementation of the user interface is shown in FIGS. 6 and 7. In a preferred embodiment, to be used in an environment such as the World Wide Web, the graphical interfaces are implemented using HTML. Details of this implementation will be omitted, since they would be known to persons skilled in the fields of HTML and other graphical user interfaces.

Referring first to FIG. 6, a selection menu is provided for the user. The menu lists video objects which are available. The listing may include thumbnail images 46 which illustrate the content of the video objects, text captions 48 naming or describing the video objects, or other suitable descriptors. Also, the menu may include other information which may be of use to the user, such as the characteristics of the stored file. For instance, FIG. 6 shows a legend "Energy 1 mpeg file" 50, which informs the user that the video data object contains image information which is compressed according to the MPEG data compression standard. The listed video objects are preferably provided in HTML format, so that the user can select a video object (step 20 of FIG. 3) by a suitable means such as mouse-clicking on the thumbnail image or other identifier.

Responsive to the user command, the server 14 obtains the video object and, as per FIG. 4, responds to the client machine 10. In step 44 of FIG. 3, a user interface is provided for viewing and browsing the video object. A preferred embodiment, for use on the Web, is illustrated in FIG. 7.

FIG. 7 shows a graphical image that would be displayed on the client machine for the user's viewing. In accordance with the invention, representations of several temporal points in the video object are shown. Preferably, these representations are shown as thumbnail images 52. For ease of comprehension, the thumbnail images 52 are preferably shown in temporal order, in a user-intuitive arrangement such as from left to right, forming a "storyboard" that lets the user scan his/her eyes from left to right, and get a sense of the sequence of images or events in the video object.

To further assist the user in getting a sense of where the displayed thumbnail images occur in the video object, a representation of the video object in its entirety, and of the portion covered by the displayed thumbnail images, is given. In FIG. 7, this is shown as a slider bar 54. The slider bar 54 is shown horizontally, but can be in any suitable configuration, preferably a configuration which comports well with user intuition. The entire horizontal lengrth of the slider bar 54 represents the total suration of the video object, and a marker 56 represents the relative location, within the video object, of the displayed thumbnail images. Preferably, the marker 56 has a width, relative to the width of the entire slider bar 54, which reflects the portion of the entire video data object covered by all of the displayed representations.

The marker 56 may be moved using the technique, familiar to users of slider bars in conventional GUI window applications, of moving a cursor onto the marker 56 with a mouse, holding the mouse button down, and dragging and dropping the marker 56 by moving the mouse. Alternatively, a GUI control panel 55 may be provided, having buttons such as the left, right, fast left, and fast right buttown shown. By positioning the cursor on one of these buttons, or other suitable control buttons, and pressing a mouse button, the user causes the marker 56 to scroll along the slider bar 54.

Regardless of what particular technique the user uses to move the marker 56 along the slider bar 54, representations of points within the video data object appear and disappear to represent the key frames in whichever part of the video data object the marker 56 is covering at that moment. Thus, by moving the marker 56, the user selects a portion of the video data object which he or she wishes to view in more detail.

Also in accordance with the invention, identifying indicia such as consecutive numbers may be assigned to the key frames, to assist the user in keeping track of which key frames have been examined, or where, within the video data object as a whole, a given image appears. This information may be provided in the user interface. A shot count 57 displays the indicia, in the form of consecutive numbers. For instance, in FIG. 7, the marker 56 is at the left end of the slider bar 54. Let us say, then, that the first six thumbnails in the video data object being viewed are displayed. Accordingly, the shot count 57 displays a value of 1, indicating that the left-most thumbnail image represents the first thumbnail (i.e., the earliest temporal point) of the video data object. If a user were then to use the controls 55 or the marker 56 to move through the video data object, then, as the marker 56 moved to the right and different thumbnails 52 appeared for later points in the video data object, the shot count 57 would likewise ascend in value. As a result, a user might identify a shot of particular interest, and remember it for easy future access by taking note of the value of the shot count.

Step 22 of FIG. 3 is illustrated, in a preferred embodiment, by the thumbnail images 52 and the slider bar 54, discussed above.

Also in accordance with the invention, the user interface includes means for selecting an interval within the data objects. The interval is selected in terms of the displayed representations. Preferably, the user selects one of the representations, and the interval is selected in terms of an interval between the selected representation and another one of the representations, such as the temporally subsequent one of the representations. The method step 44 of FIG. 3, in which a user interface is provided for facilitating viewing and browsing, is implemented by providing the means for selecting.

In accordance with the invention, the user interface provided in step 44 includes means for selecting an interval between two of the key frames. Preferably the means for selecting an interval operates in conjunction with the graphical user interface GUI of the system according to the invention. That is, a user uses a GUI input device, such as a mouse, to select a representation of a desired interval from several representations of intervals shown on the display.

Figure 8:
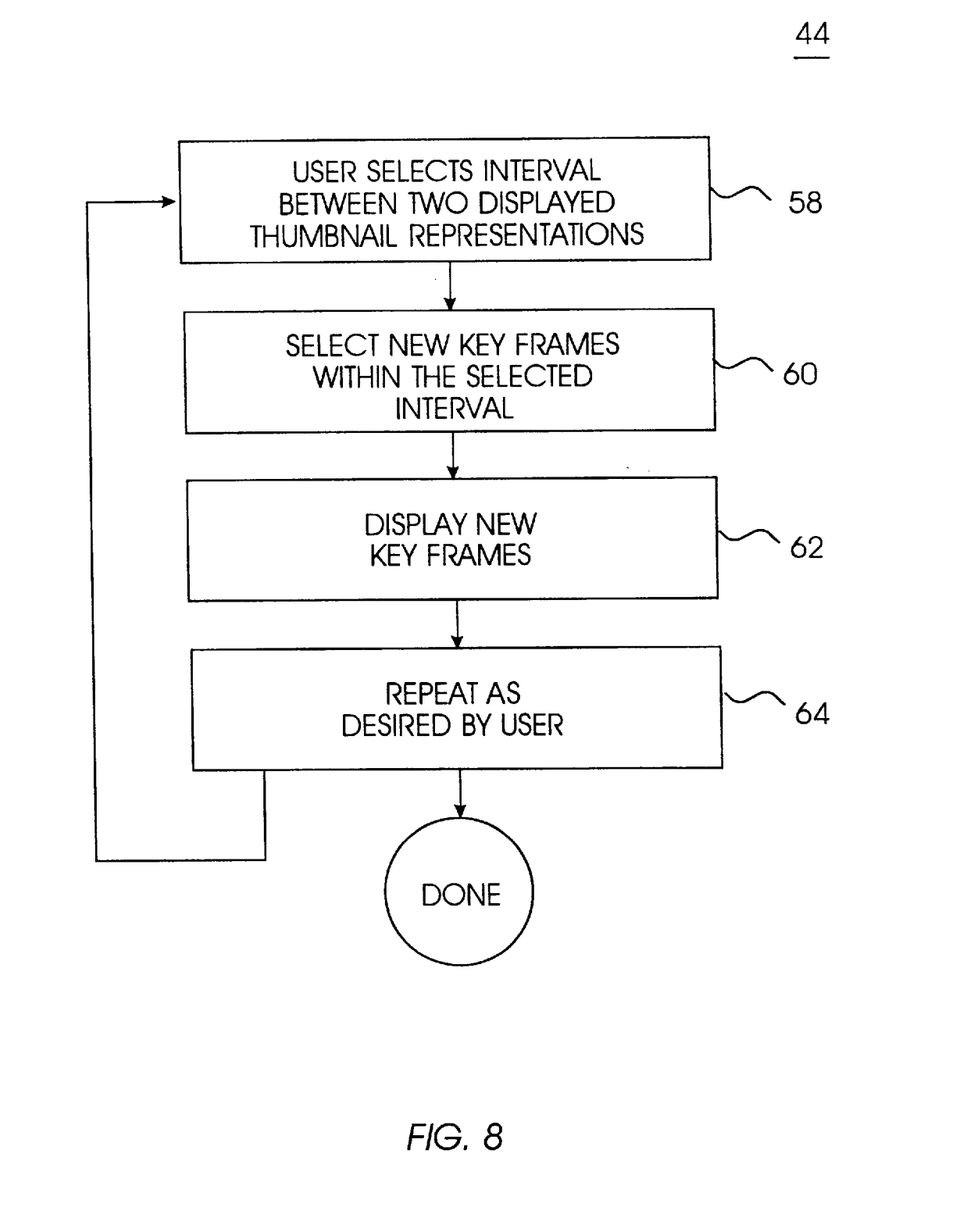
FIG. 8 is a flowchart showing a more detailed implementation of a step of the flowchart of FIG. 3.

A preferred way of performing step 44 is shown in FIG. 8.

Referring to FIG. 8, a user is initially presented with a set of representations of frames of the video object, such as the sequence 52 of thumbnails shown in FIG. 7. The user views the thumbnails and decides that a portion of the video object which he/she would like to examine in more detail falls between two of the thumbnails. The user selects the interval (step 58) through the graphical user interface. In the preferred embodiment of FIG. 7, for instance, the user selects one of the thumbnail images. The thumbnail image is implemented as a hyperext link, and the user's selection of the thumbnail indicates that he/she is interested in the interval between that thunmbnail and an adjacent thumbnail (preferably the thumbnail which follows the selected thumbnail, temporally).

The user's selection of the thumbnail is processed in known manner as a hypertext selection, and a message is sent to the server. The server examines the portion of the video object between the selected frame and the next frame. In a manner similar to that of step 28 in FIG. 4, the server selects a new set of key frames falling between the selected frame and the next frame (step 60).

The selected new frames are then displayed (step 62), essentially in the same manner as before (steps 30 and 32 of FIG. 4). Also, the slider bar 56 reflects the selection of the interval by moving and/or changing in width.

In many cases, the user will want to perform several iterations of this process, in order to narrow down to the particular small area of interest within the video object. Accordingly, a repetition loop is shown in FIG. 8 (step 64 and the loop back to step 58).

While the preferred embodiments of the present invention have been illustrated in detail, it should be apparent that modifications and adaptations to those embodiments may occur to one skilled in the art without departing from the scope of the present invention as set forth in the following claims.

What is claimed is:

1. A system for facilitating user examination and browsing of video data object information pertaining to a stored video data object (Object), the Object including a beginning point, an end point, and points therebetween, the system comprising:

a display unit;

an interface for coupling the display unit with a network communication medium, the medium being coupled to a video repository having video data objects, including the Object, stored therein;

means for sending, through the interface and over the medium, a request to view the Object;

means, responsive to receipt of a response to the request to view, for displaying a sequence of representations, each representation corresponding with one of the points in the Object;

means for selecting an interval in terms of a first one of the points; and means, operable responsive to operation of the means for selecting an interval, for providing a subsequence of representations, each representation of the subsequence corresponding with a respective point in the Object, each of the respective points falling within the selected interval.

2. A system as recited in claim 1, wherein:

the network communication medium includes the Internet;

the interface includes an Internet interface; and the video repository includes a server on the Internet.

3. A system as recited in claim 1, wherein the beginning point, the end point, and the points are temporal points within the Object.

4. A system as recited in claim 1, wherein the means for displaying includes means for displaying still images representative of content of the Object at respective ones of the points in the Object.

5. A system as recited in claim 4, wherein the means for displaying includes:

means for generating thumbnail images based on content of the Object at respective ones of the points in the Object; and means for displaying the thumbnail images.

6. A system as recited in claim 1, wherein the means for displaying includes:

means for displaying a representation of the Object in its entirety; and means for displaying a representation of a portion of the Object covered by the displayed representations of points in the Object.

7. A system as recited in claim 6, wherein, in the means for displaying a representation:

the means for displaying the representation in its entirety includes a slider bar; and the means for displaying a representation of a portion of the Object covered by the displayed representations of points in the Object includes a marker on the slider bar.

8. A system as recited in claim 7, wherein:

the means for selecting an interval includes means for moving the marker along the slider bar from a first position thereon to a second position thereon; and the means for displaying the sequence of representations includes means, responsive to movement of the marker along the slider, for displaying representations of points within the Object corresponding with the second position of the marker, in place of previously displayed representations of points within the Object corresponding with the first position of the marker.

9. A system as recited in claim 1, wherein the means for selecting an interval includes means for selecting one of the representations of still images which forms a boundary of the interval to be selected.

10. A system as recited in claim 9, wherein the means for selecting an interval further includes means for selecting one of the representations of still images which forms a first boundary of the interval to be selected, a next one of the representations forming a second boundary of the interval.

11. A method for facilitating user examination and browsing of video data object information pertaining to a stored video data object (Object), the Object including a beginning point, an end point, and points therebetween, the method comprising the steps of:

providing, to a user interface, a sequence of representations, each representation corresponding with one of the points in the Object; wherein the step of providing includes communicating, through a network communication medium, with a video repository having video data objects, including the Object, stored therein;

a user utilizing a user interface to select an interval of the Object in terms of a first one of the points; and responsive to user selection of such an interval, providing a subsequence of representations, each representation of the subsequence corresponding with a respective point in the Object, each of the respective points falling within the selected interval.

12. A method as recited in claim 11, wherein:

the network communication medium includes the Internet; and the video repository includes a server on the Internet.

13. A method as recited in claim 11, wherein the beginning, the end, and the points are temporal points within the Object.

14. A method as recited in claim 11, wherein the step of providing a sequence of representations includes displaying still images representative of content of the Object at respective ones of the points in the Object.

15. A method as recited in claim 11, wherein the step of providing a sequence of representations includes:

generating thumbnail images based on content of the Object at respective ones of the points in the Object; and providing thumbnail images representing still frames of the video object at the respective points therein.

16. A method as recited in claim 11, wherein the step of providing a user interface includes:

displaying a representation of the Object in its entirety; and displaying a representation of a portion of the Object covered by the displayed representations of points in the Object.

17. A method as recited in claim 16, wherein:

the step of displaying the representation in its entirety includes displaying a slider bar; and the step of displaying a representation of a portion of the Object covered by the displayed representations of points in the Object includes displaying a marker on the slider bar.

18. A method as recited in claim 17, wherein:

the step of selecting an interval includes moving the marker along the slider bar from a first position thereon to a second position thereon; and the step of displaying the sequence of representations includes the step, responsive to movement of the marker along the slider, of displaying representations of points within the Object corresponding with the second position of the marker, in place of previously displayed representations of points within the Object corresponding with the first position of the marker.

19. A method as recited in claim 11, wherein the step of selecting an interval includes selecting one of the representations of still images which forms a boundary of the interval to be selected.

20. A method as recited in claim 19, wherein the step of selecting an interval further includes selecting one of the representations of still images which forms a first boundary of the interval to be selected, a next one of the representations forming a second boundary of the interval.

* * * * *